United States Patent [19]

Brennan

[11] 4,323,298

[45] Apr. 6, 1982

[54] WIDE FIELD OF VIEW GOGGLE SYSTEM

[75] Inventor: Thomas M. Brennan, Cambridge, Mass.

[73] Assignee: Baird Corporation, Bedford, Mass.

[21] Appl. No.: 157,018

[22] Filed: Jun. 6, 1980

Related U.S. Application Data

[63] Continuation of Ser. No. 967,273, Dec. 7, 1978, abandoned.

[51] Int. Cl.³ .................. G02B 23/12; G02B 23/18
[52] U.S. Cl. .......................... 350/36; 350/72; 350/75
[58] Field of Search .............. 350/36, 75, 76, 145, 350/146, 213 VT; 351/5; 2/430, 433, 437

[56] References Cited

U.S. PATENT DOCUMENTS

| | | | |
|---|---|---|---|
| 1,033,965 | 7/1912 | Troppman | 350/145 |
| 2,935,910 | 5/1960 | Schmidt | 350/146 |
| 3,029,696 | 4/1962 | Schmidt | 350/76 |
| 3,787,688 | 1/1974 | Stone | 350/146 |
| 3,899,244 | 8/1975 | Mulder | 350/146 |
| 3,971,933 | 7/1976 | Adamson | 250/213 VT |

FOREIGN PATENT DOCUMENTS

| | | | |
|---|---|---|---|
| 590815 | 3/1925 | France | 350/76 |
| 38627 | 6/1931 | France | 350/75 |

*Primary Examiner*—Jon W. Henry
*Attorney, Agent, or Firm*—Morse, Altman, Oates & Dacey

[57] ABSTRACT

A wide field of view goggle system with a pair of viewing channels that are mounted on a platform and are constrained for relative lateral and angular movement. Control mechanisms are provided for adjustment of the interpupillary distance between the channels and the angular position of the channels relative to one another. An instantaneous wide field of view is provided by relative angular orientation of the viewing channels in a common, overlapping field of view.

2 Claims, 5 Drawing Figures

WIDE FIELD OF VIEW GOGGLE SYSTEM

This is a continuation, of application Ser. No. 967,273 filed on Dec. 7, 1978 now abandoned.

BACKGROUND OF THE INVENTION

1. Field of the Invention

The present invention relates to viewing systems and, more particularly, is directed towards a wide field of view goggle system.

2. Description of the Prior Art

Generally, night vision goggles include a pair of viewing channels, each channel having an objective lens, an image intensifier tube and an eyepiece. The center of one channel's axis is oriented parallel to the center of the other channel's axis so that the system's field of view is determined essentially by the field of an individual channel. The increased angular field of existing goggles, due to the distance between the axis of each channel, is not significant. In present goggle systems with a fixed diameter (area) intensifier tube, the field of view and the resolution of the system are directly related.

SUMMARY OF THE INVENTION

It is an object of the present invention to provide a goggle system with an instantaneous wide field of view.

Another object of the invention is to provide a method for obtaining an instantaneous wide field of view in a goggle system by angular orientation of a pair of relatively movable narrow viewing channels.

A further object of the invention is to provide a night vision goggle system with an instantaneous wide field of view. The system is characterized by a pair of relatively movable viewing channels that are mounted to a housing. The channels are constrained in such a manner that both the interpupillary distance and the angular position of the channels are adjustable relative to one another. The relative angular orientation of the viewing channels in a common plane provides a common, overlapping field of view, the total instantaneous field being equal to the sum of the individual fields minus the angle between the fields of view.

Other objects of the present invention will in part be obvious and will in part appear hereinafter.

The invention accordingly comprises the apparatus, together with its parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
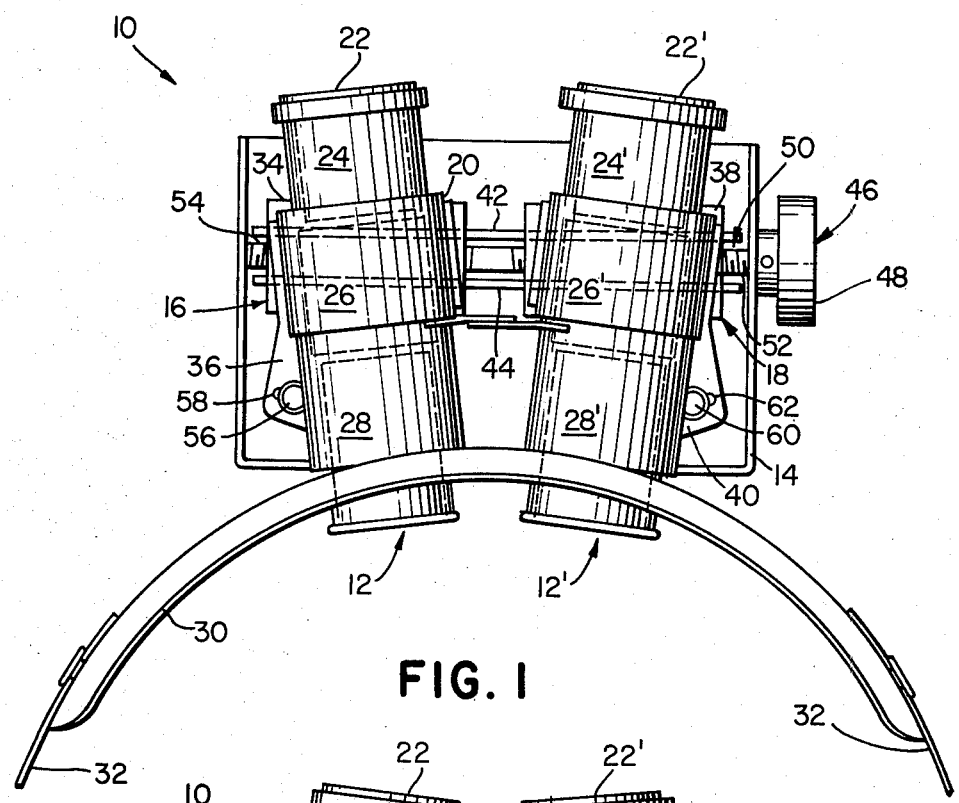
FIG. 1 is a plan view of a goggle system having a diverging optical channel configuration.

Referring now to the drawings, particularly FIG. 1, there is shown an optical system 10, for example a goggle system, particularly a night vision goggle system, having a pair of optical channels 12 and 12' that are mounted to a frame or platform 14 by means of channel supports 16 and 18, respectively. Optical channels 12 and 12' are identical optical channels and therefore, corresponding elements of optical channels 12 and 12' are denoted by like reference characters and are distinguished by prime notations. Channel 12, for example an image intensifier unity power channel, includes a housing 20 with an iris 22, an objective lens 24, an image intensifier tube 26 and an eyepiece 28. In the preferred embodiment, objective lens 24 is a f/1, 16.5 mm format objective lens with a focal adjusting thread; image intensifier tube 26 is a 12 mm format image inverting intensifier tube; and eyepiece 28 is a 16.5 mm focal length eyepiece with a diopter adjustment and a field of view of forty degrees. A facial hood 30 having straps 32 is adjustable to fit over the top and around the rear of a user's head. Facial hood 30 holds platform 14 which extends outwardly from the user's forehead.

Optical channels 12 and 12' are laterally movable relative to each other for interpupillary adjustment and are angularly movable for adjustment of the angular orientation of the optical axis of each channel relative to one another. Channel support 16 includes a base 34 and a body 36, and channel support 18 includes a base 38 and a body 40. Platform 14 is provided with a pair of guide rails 42 and 44 which are disposed in paths that are in space parallel relationship to a plane in which the user's eyes are disposed. Bases 34 and 38 are constrained for lateral movement by guide rails 42 and 44. The distance between channel supports 16 and 18 is controlled by an adjusting member 46 with an enlarged head or knob 48 and a threaded shaft 50 having right hand threads 52 and left hand threads 54. When knob 48 is turned in one direction, bases 34 and 38 move towards each other on guide rails 42 and 44. When knob 48 is turned in the opposite direction, bases 34 and 38 move away from each other on guide rails 42 and 44. Since optical channel 12 is carried on base 34 and optical channel 12' is carried on base 38, the optical channels laterally move either towards or away from each other in a common plane depending upon the direction in which knob 48 is rotated. From the foregoing, it will be apparent that adjusting member 46 constitutes an interpupillary adjusting device for varying the interpupillary distance between optical channels 12 and 12'.

Figure 2:
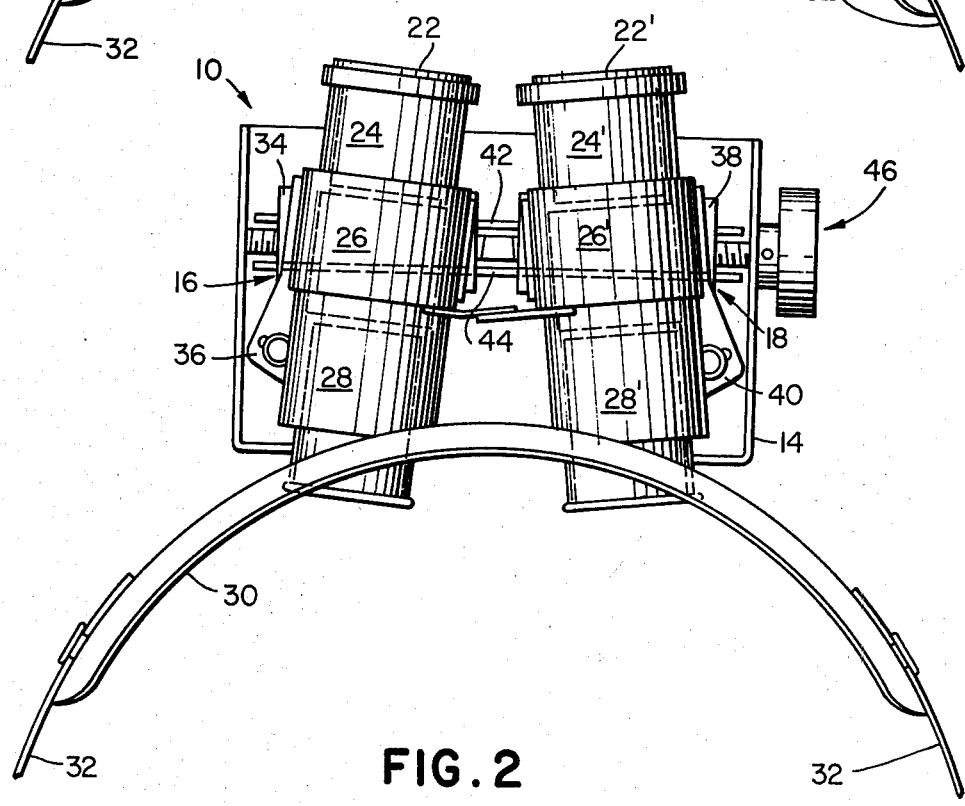
FIG. 2 is a plan view of the goggle system in a converging optical channel configuration.

Optical channel 12 is carried on body 36 which is pivotally mounted to base 34 and optical channel 12' is carried on body 40 which is pivotally mounted to base 38. A locking device 56, for example a thumb screw, which is received in a slot 58 formed in body 36, is turned into base 34 for captively holding channel 12 in a fixed angular position. When thumb screw 56 is loosened, body 36 is movable in a arcuate path for angularly positioning channel 12. In a similar manner, a locking device 60, for example a thumb screw, which is received in a slot 62 in body 40, is turned into base 38 for captively holding channel 12' in a fixed angular position. When thumb screw 60 is loosened, body 40 is movable in arcuate path for angularly positioning chanel 12'. That is, the relative angular position of optical channels 12 and 12' with respect to one another is variable. FIG. 1 shows goggle system 10 in a diverging optical channel configuration and FIG. 2 shows goggle system 10 in a converging optical channel configuration.

Figure 3:
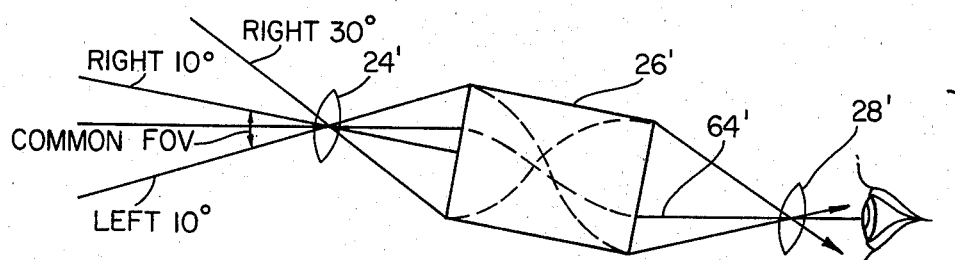
FIG. 3 is a chief ray plot of the diverging configuration of FIG. 1.
Figure 4:
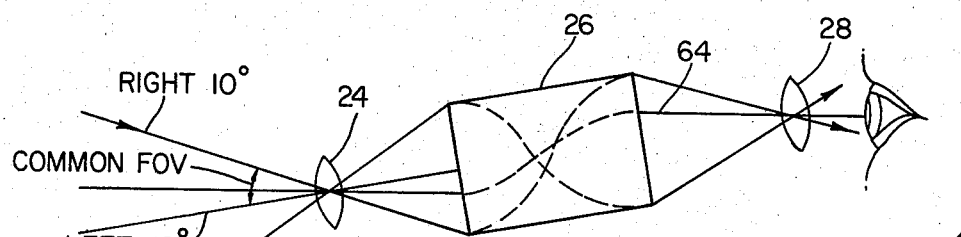
FIG. 4 is a chief ray plot of the converging configuration of FIG. 2.
Figure 4:
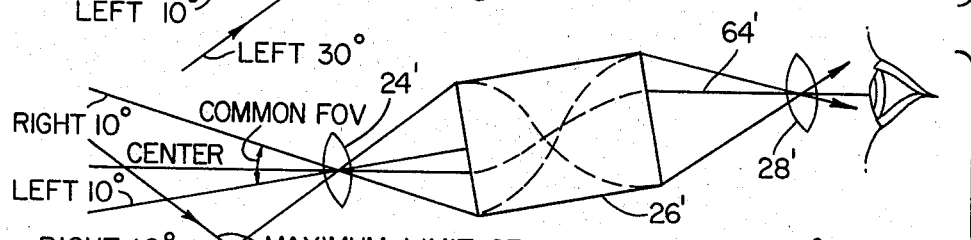
Figure 5:
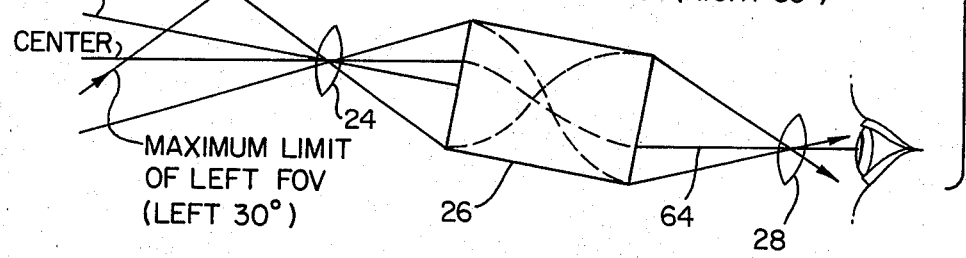
FIG. 5 is a graphical plot of the coverage of each eye in both configurations.
Figure 5:
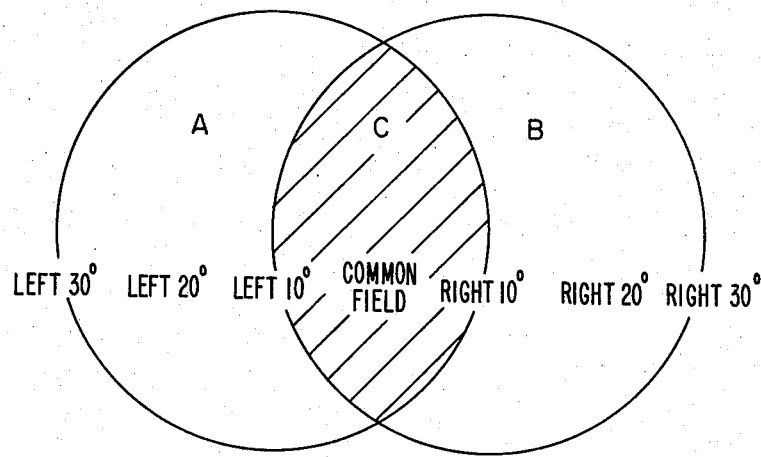

In the illustrated embodiment of FIGS. 3 and 4, the line of sight of each optical channel 12 and 12' is adjusted and locked so that the angle therebetween is twenty degrees. Interpupillary adjusting mechanism 46 is adjusted so that the center of the optical axis 64 and 64' from each eyepiece 28, 28', respectively, intersects the user's eye. The center-to-center eye distance is in the range of fifty-five mm to seventy two mm. Therefore, the user's left and right eyes have twenty degrees common field when looking straight ahead. The total field of view (FOV) seen by both eyes is sixty degrees. FIG. 5 illustrates graphically that each eye has a field of view of forty degrees. Reference character A is the left field and reference character B is the right field when the channels are in the diverging configuration of FIG. 1 and A is the right field and B is the left field when the channels are in the converging configuration of FIG. 2, reference character C denotes the common field to both eyes. The focus of each objective lens 24, 24' is set for normal operating distance and the diopter adjustment of each eyepiece 28, 28' is set for user comfort.

From the foregoing, it will be apparent that the present invention features an arrangement of two obliquely disposed optical channels which provide an increase in the field of view while achieving the same angular resolution as if the two channels were arranged parallel to each other. The optical channels are constrained for both relative lateral movement and relative angular movement in a common plane, the final position of the channels being such that the optical axis of one channel intersects the optical axis of the other channel. An instantaneous wide field of view is provided by orienting each individual narrow optical channel 12, 12' in a common plane at an angle to each other such that there is a common, overlapping field of view. The total instantaneous field of view is equal to the sum of the individual field of view of each optical channel 12, 12' minus the angle between the fields of view. The total field of view of the left channel can be seen by the left eye and the total field of view of the right channel can be seen by the right eye. The increased field of view provides increased performance characteristics for the user because the image presented has as much angular resolution over a wider angular field as goggles equipped with the same tube operated in a parallel mode with the same angular field in each channel. Goggle system 10 has a better angular resolution over a wide field than a conventional goggle system with a totally common field of view and equipped with the same format and with lenses which would result in as wide a field of view.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An optical viewing device in the form of a night vision goggle system and having a wide field of view, said system comprising:

(a) a frame;
(b) adjusting means mounted to said frame and including a first channel support and a second channel support, said first channel support having a first base and a first body, said second channel support having a second base and a second body, said first base and said second base constrained to said frame for relative lateral movement, said first body mounted to said first base for pivoting movement relative thereto, said second body mounted to said second base for pivoting movement relative thereto, first means for controlling said relative lateral movement of said first base and said second base to effect interpupillary adjustment over an interpupillary distance of from about fifty-five mm. to about seventy-two mm., and second means for controlling said pivoting movement of said first body and said second body, said second means being fixed once said pivoting movement of said first and second body relative to one another has been effected;
(c) a first optical channel with a narrow field of view and having a first optical axis, said first optical channel mounted to said first channel support of said adjusting means;
(d) a second optical channel with a narrow field of view and having a second optical axis, said second optical channel mounted to said second channel support of said adjusting means, the angular magnitude of said field of view of said first optical channel being the same as the angular magnitude of said field of view of said second optical channel;
(e) said first optical axis and said second optical axis constrained for relative angular movement with respect to one another in a common plane to provide an increased wide field of view characterized by having a common overlap and an angular resolution equal to that provided by said field of view of said first and second optical channels, said first optical axis and said second optical axis intersecting one another at an angle of about twenty degrees.

2. The optical viewing device as claimed in claim 1 wherein each said optical channel includes an objective lens, image intensifier means and an eyepiece, said viewing device having unity magnification, and wherein said first means includes a pair of guide rails and an adjusting member having a head and a threaded shaft operatively mounted within said pair of guide rails, said shaft provided with left and right hand threads for said first and second bases respectively, and said second means includes a slot formed respectively in said first and second body and a fastening member operatively mounted within said slot, whereby said pivoting movement of said first and second body with respect to said frame is first selected and then fixed.

* * * * *